Nov. 22, 1932.    J. WAHL ET AL    1,888,365
PRESSURE GAUGE
Filed April 30, 1927
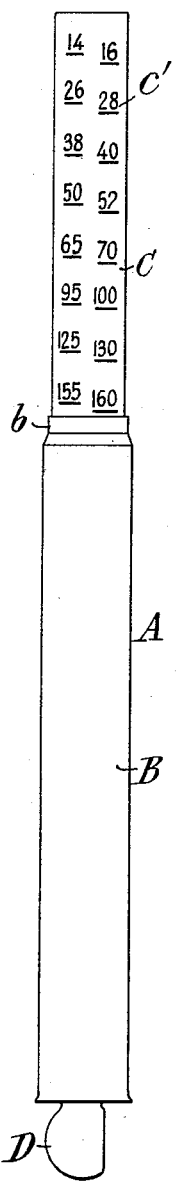
Fig.1.
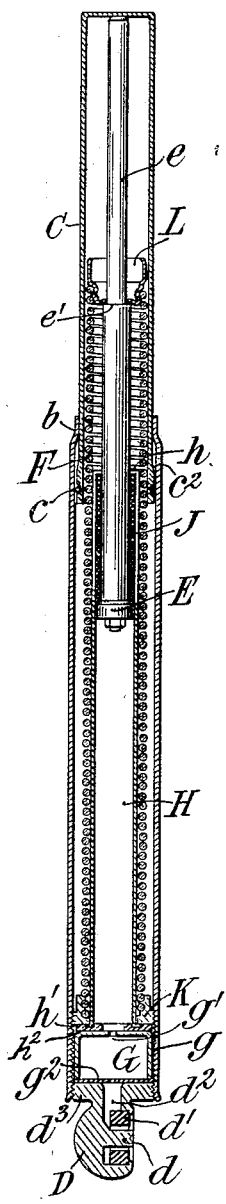
Fig.2.
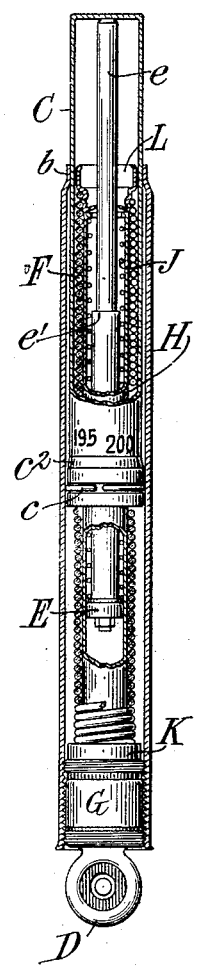
Fig.3.
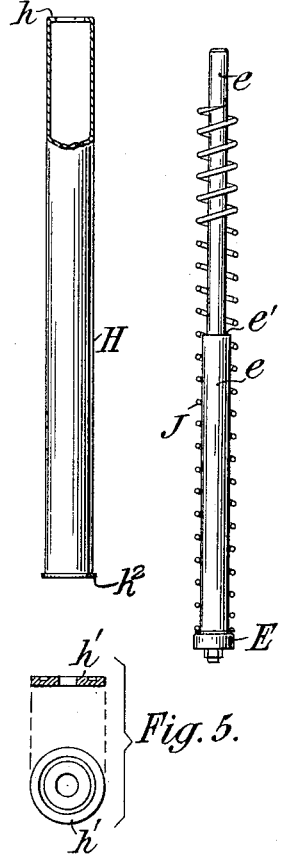
Fig.4.    Fig.7.
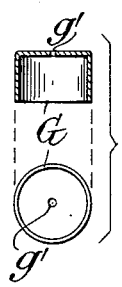
Fig.5.
Fig.6.
INVENTORS:
John Wahl and
Otto Melzer,
By Attorneys,
Fraser, Myers & Manley Patented Nov. 22, 1932

1,888,365

UNITED STATES PATENT OFFICE

JOHN WAHL, OF ROSEDALE, AND OTTO MELZER, OF HOLLIS, NEW YORK, ASSIGNORS TO A. SCHRADER'S SON, INC., OF NEW YORK, N. Y., A CORPORATION OF NEW YORK

PRESSURE GAUGE

Application filed April 30, 1927. Serial No. 187,908.

This invention relates to pressure gauges and aims to provide certain improvements therein. More particularly, the invention relates to tire pressure gauges of the telescoping indicating sleeve type adapted to register the wide range of pressures to which tires of different types are inflated.

In ascertaining tire pressures, according to present practice, two separate gauges are employed; one for the relatively low pressures to which balloon tires are inflated, and another gauge for the higher pressures to which the so-called high pressure tires are inflated. Of course, the motorist naturally provides himself with a gauge having the pressure range of the type of tire on his car. At service stations, however, the operator must rely on two separate gauges, which not only necessitates carrying two gauges on his person, but often provokes vexation when he withdraws the wrong gauge to take a tire pressure reading.

According to the present invention we provide a pressure gauge which eliminates the need and inconvenience of using two separate gauges. Our new gauge is capable of measuring both the relatively low pressures used in balloon tires, and the higher pressures employed in the high pressure tires with the same degree of accuracy now realized with separate gauges, and is usable in precisely the same manner as the conventional tire pressure gauge. In its broadest aspect our invention consists of a pressure gauge comprising a casing, a plurality of pressure-responsive means, and a pressure-indicating member movable in response to the movement of the pressure-responsive means. In a more specific aspect, a preferred embodiment of our invention comprises a tubular casing, an indicating member telescoping with said casing, a pressure-responsive element movable in said casing, adapted, when subjected to pressure, to move the indicating member to indicating position, and a second pressure-responsive element movable with said first pressure-responsive element upon said first pressure-responsive element being subjected to greater than a predetermined pressure. The invention also embodies other features of novelty which will be hereinafter more fully described.

A preferred embodiment of our invention is shown in the accompanying drawing, wherein Figure 1 is an elevation of a pressure gauge embodying our invention.

Fig. 2 is a longitudinal diametrical section of the gauge shown in Fig. 1.

Fig. 3 is a view similar to that shown in Fig. 2, partly in elevation, with the indicating member projected to a lesser degree.

Figs. 4 to 7 show details of the invention.

Referring to the drawing, let A indicate the pressure gauge as a whole, which comprises as its essential constituent elements a tubular casing B, an indicating member C, a press-on foot portion D, a spring-pressed piston E, a loading spring F, an expansion chamber G and a tubular piston chamber H.

The parts B, C and D are similar to those now generally employed in a certain make of balloon and high pressure tire gauges, wherein the telescoping indicating member C is adapted to be held in any pressure-indicating position with respect to the casing B through the medium of a split spring ring $c$ carried by the member C near the inner end thereof and in frictional engagement with the inner wall of the casing B.

Within the casing B is positioned the tubular member H, which is open at both ends and has movable therein the piston E. Movement of the piston E under the influence of fluid pressure admitted into the member H is resisted by a compression spring J positioned between said piston E and an inturned flange $h$ at the top of the member H. Carried by the piston E is a piston rod $e$ of a diameter to pass through the opening in the top of the member H, said piston rod $e$ being formed for a portion of its length with reduced diameter, whereby there is provided a shoulder $e'$, the function of which will hereinafter be made apparent.

Surrounding the member H, and spaced between it and the casing B, is the tension loading spring F, the lower or innermost end of which is carried by an anchor member K fixedly mounted within the casing B near the lower end thereof through the medium of a screw-threaded connection. The upper or outermost end of said spring F is connected to a cup-shaped plunger L which is adapted to be moved outwardly into the indicating member C. The bottom of said cup member L is formed with an opening through which the reduced portion of the piston rod $e$ is adapted to freely move, but through which the larger portion of said piston rod can not pass. In other words, after the reduced portion of the piston rod passes through the bottom of the plunger L and said bottom is engaged by the shoulder $e'$ on the piston rod, further outward movement of said piston rod carries with it the plunger L, distending the spring F. It will thus be seen that the spring-pressed piston E may be considered a pressure-responsive element or means and the spring tensioned plunger L a second pressure-responsive element or means.

The spring J is a relatively weak spring and is employed to measure relatively low pressures such as are used in balloon tires. The spring F, on the other hand, is a relatively heavy spring and can only be distended when subjected to relatively high pressures, such as are employed in high pressure tires. The normal arrangement of the piston rod $e$ and plunger L, and the relative compression and tension strengths of the springs J and F, are preferably such that when the spring-pressed piston E is subjected to a predetermined range of pressures, it will move the piston rod $e$ outwardly to a point where the shoulder $e'$ will engage the underside of the plunger L, and upon subjecting said piston E to higher than said predetermined pressure range, its movement will be retarded because then it would have to overcome, in addition to the compression of the spring J, the distension of the loading spring F. It will thus be apparent that the indicating member C will move outwardly uniformly during the compression of the spring J throughout a predetermined pressure range, and at a lower uniform rate when subjected to greater pressures. This difference in rate of uniform movement is availed of to space the pressure indicia $c'$ on the indicating member C, so that the indicia for the low pressure range, namely, from 10 to 60 pounds, may be made to occupy about one-half of the total length of the indicating member C, and pressures from 60 to about 200 pounds, the other half. It is also proposed to uniformly space the pressure indicia on said indicating member; hence it will be apparent that the indicia on the upper and lower halves of the indicating member will be arranged in different arithmetical progressions. As shown in the drawing, the indicia on the upper half of the member C progresses with the constant 2, whereas the indicia on the lower half of the member C progresses with a constant 5. It will be apparent that this same principle may be employed in a gauge designed for use with either relatively higher or lower pressures, and in this manner a given length of indicating member can be employed for indicating with uniformly spaced indicia a wide range of pressures.

The foot portion D is provided with a tire valve depressor $d$ and a packing gasket $d'$ adapted to form a leak-tight engagement with the end of a tire valve, and a passage $d2$ through which air from the tire can enter the gauge. In order, however, to prevent the rush of air from the tire directly acting upon the piston E and thereby give rise to an inaccurate registration of pressure, we have provided the expansion chamber G between the duct $d^2$ and the interior of the tubular member H. Said expansion chamber is provided by the cup-shaped member $g$ having a pin opening $g'$ in the base thereof, and a cover gasket $g^2$ having a pin opening therein. It will thus be apparent that the air from the tire, after passing through the duct $d^2$ and entering through the pin hole opening in the member $g^2$, will first expand into the chamber and then slowly pass through the pin hole opening $g'$ into the member H. The parts H and $g$ are held within the casing through the medium of the screw-threaded engagement between the base $d^3$ of the foot portion and the casing B, the member H having an outwardly directed flange $h^2$ which is thus held against the base of the screw-threaded anchor member K or in any other desired manner. To insure against leakage of air between the chamber G and the interior of the member H, a packing $h'$ is positioned between the member $g$ and the flange $h^2$ of the member H. To prevent movement of the indicating member C through the top of the casing B, said top is spun inwardly, as shown at $b$, to form a shoulder which cooperates with a shoulder $c^2$ provided near the lower end of the member C.

From the foregoing description it will be apparent that we have provided a simple tire pressure gauge peculiarly adapted for use at service stations where tires inflated to a wide range of pressures have to be tested, which pressure gauge, in outward appearance and manner of use, is not different from the separate conventional gauges now in general use.

While we have shown and described a preferred embodiment of our invention, we do not wish to be limited to the construction illustrated and described, since modifications thereof may be resorted to without departing from the spirit of the invention.

What we claim is:

1. A pressure gauge comprising a tubular elongate casing having a fluid inlet at one end, a piston in said casing, a spring for resisting movement of said piston when subjected to fluid pressure, an indicating member movable through the top of said casing by the movement of the piston under fluid pressure, a tension spring for supplementing and coacting with the first named spring to resist further movement of said piston after it has been moved a predetermined distance.

2. A pressure gauge comprising a casing, a tubular member within the casing adapted to receive fluid under pressure, a pressure-responsive piston in said tubular member, said piston having a rod provided with an abutment, spring means acting to resist movement of the piston upon admission of fluid under pressure within the tubular member, a loading spring between the walls of the casing and the tubular member engageable by the abutment on the piston rod to additionally load the piston after it has been moved by the fluid pressure a predetermined distance.

3. A pressure gauge comprising a tubular casing member, a member telescoping with said casing, one of said members having substantially uniformly spaced pressure indicia thereon, said indicia for a portion of the pressure range of the indicating member being in a certain arithmetical progression, and for another portion thereof in a different arithmetical progression, pressure-responsive means within the casing adapted to move said telescoping member relatively to the casing member to indicate pressures, a plurality of springs adapted to resist movement of the pressure-responsive means, only one of said springs being active during the movement of the telescoping member through the first arithmetical progression range while the other spring supplements the action of the first during movement of the telescoping member through the second arithmetical progression range.

4. A pressure gauge comprising an elongate tubular casing having a fluid inlet at one end, pressure-responsive means within said casing, pressure-indicating means movable with respect to the casing and operable by the movement of the pressure-responsive means when acted upon by fluid pressure, said pressure-indicating means having indicia which are equally spaced for a portion of the pressure range of the gauge and follow in a certain arithmetical progression, and which for another portion of the pressure range of the gauge are equally spaced and follow in a different arithmetical progression, resilient means within said casing for resisting movement of the pressure-responsive means when the latter is subjected to pressure, said resilient means comprising a compression spring and a tension spring, only one of said springs being operative, for gauging the pressure within one of the arithmetical pressure ranges, and both of said springs cumulatively being operative for gauging pressures within the other of the arithmetical pressure ranges.

In witness whereof, we have hereunto signed our names.

JOHN WAHL.
OTTO MELZER.